US012582967B2

(12) United States Patent
Riley et al.

(10) Patent No.: US 12,582,967 B2
(45) Date of Patent: Mar. 24, 2026

(54) MULTI-CATIONIC ALUMINATE SPINELS

(71) Applicants: National Technology & Engineering Solutions of Sandia, LLC, Albuquerque, NM (US); UNM Rainforest Innovations, Albuquerque, NM (US)

(72) Inventors: Christopher Ryan Riley, Albuquerque, NM (US); Abhaya Datye, Albuquerque, NM (US); Andrew De La Riva, Albuquerque, NM (US)

(73) Assignees: National Technology & Engineering Solutions of Sandia, LLC, Albuquerque, NM (US); UNM Rainforest Innovations, Albuquerque, NM (US)

( * ) Notice: Subject to any disclaimer, the term of this patent is extended or adjusted under 35 U.S.C. 154(b) by 484 days.

(21) Appl. No.: 18/138,420

(22) Filed: Apr. 24, 2023

(65) Prior Publication Data

US 2023/0347319 A1     Nov. 2, 2023

Related U.S. Application Data

(60) Provisional application No. 63/337,232, filed on May 2, 2022.

(51) Int. Cl.
| | |
|---|---|
| *B01J 23/00* | (2006.01) |
| *B01J 23/755* | (2006.01) |
| *C01B 3/40* | (2006.01) |

(52) U.S. Cl.
CPC .......... *B01J 23/005* (2013.01); *B01J 23/755* (2013.01); *C01B 3/40* (2013.01); *C01B 2203/0233* (2013.01); *C01B 2203/1058* (2013.01)

(58) Field of Classification Search
CPC ........ B01J 23/005; B01J 23/755; B01J 21/04; B01J 23/06; B01J 23/26; B01J 23/70; C01B 3/40; C01B 2203/1076
See application file for complete search history.

(56) References Cited

PUBLICATIONS

Ali et al "Ni-based nano-catalysts for the dry reforming of methane", 2020, Catalysis Today, 343, 26-37 (Year: 2020).*

(Continued)

*Primary Examiner* — Michael Forrest
*Assistant Examiner* — Nicole Lee Quist
(74) *Attorney, Agent, or Firm* — Kevin W. Bieg; Daniel J. Jenkins

(57) ABSTRACT

The present invention is directed to both stoichiometric and sub-stoichiometric high entropy aluminate spinels as a novel high entropy oxide (HEO) crystal phase. Previously reported HEOs are overwhelmingly stoichiometric structures containing a single cationic site and are stabilized solely by intermixing increasing numbers of cations. According to an aspect of the invention, sub-stoichiometric spinels, containing various mixtures of divalent metal cations and cationic vacancies in nominally equimolar concentration, provide entropic stabilization similarly to cations in stoichiometric spinels. The chromatic, structural, and chemical properties of these complex spinels are highly tunable via incorporation of cationic vacancies and multiple divalent metals, enabling their application as unique pigments, catalysts, and thermal coatings.

9 Claims, 14 Drawing Sheets

*Aluminate spinels*

*High entropy spinels*

*Vacancy-stabilized high entropy spinels*

(56)     References Cited

PUBLICATIONS

Li et al "Preparation and characterization of novel nonstoichiometric magnesium aluminate spinels", 2018, 44, 15104-15109 (Year: 2018).*

Porodko et al, "A novel high entropy spinel-type aluminate MAl2O4 (M=Zn, Mg, Cu, Co) and its lithiated oxyfluoride and oxychloride derivatives prepared by one-step mechanosynthesis", 2021, Zeitschrift fÂ¼r Physikalische Chemie, 236, 713-726 (Year: 2021).*

Shaw et al "Structural and magnetic properties of nanocrystalline equi-atomic spinel high-entropy oxide (AlCoFeMnNi)3O4 synthesised by microwave assisted co-precipitation technique", Journal of Alloys and Compounds, 2021, 878, 160269 (Year: 2021).*

Dippo, O. F. et al., "A universal configurational entropy metric for high-entropy materials," Scripta Materialia (2021) 201:113974, 4 pages.

Gil-Calvo, M. et al., "Effect of Ni/Al molar ration on the performance of substoichiometric NiAl2O4 spinel-based catalysts for partial oxidation of methane," Applied Catalysis B: Environmental (2017) 209:128-138.

Riley, C. et al., "Synthesis of Nickel-Doped Ceria Catalysts for Selective Acetylene Hydrogenation," ChemCatChem (2019) 11:1526-1533.

Riley, C. et al., "Environmentally benign synthesis of a PGM-free catalyst for low temperature CO oxidation," Applied Catalysis B: Environmental (2020 264:118547, 11 pages.

Riley, C. et al., "A High Entropy Oxide Designed to Catalyze CO Oxidation Without Precious Metals," Applied Materials & Interfaces (2021) 13:8120-8128.

Rost, C. M. et al., "Entropy-stabilized oxides," Nature Communications (2015) 6:8485, 8 pages.

Sarkar, A. et al., "High entropy oxides: The role of entropy, enthalpy and synergy," Scripta Materialia (2020) 187:43-48.

Zhang, S. et al., "NixAl1O2-δ mesoporous catalysts for dry reforming of methane: The special role of NiAl2O4 spinel phase and its reaction mechanism," Applied Catalysis B: Environmental (2021) 291:120074, 18 pages.

* cited by examiner

Regenerative oxidation

Carbon dioxide

Oxygen reactant

Sintered nickel oxide nanoparticle

During dry reforming reaction

Valuable synthesis gas product (mixture of carbon monoxide and hydrogen)

Methane and carbon dioxide reactants

Carbonaceous byproducts coat nickel catalysts

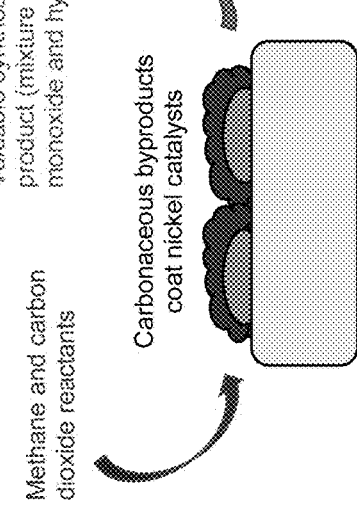

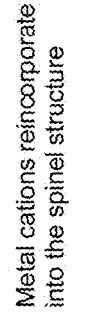

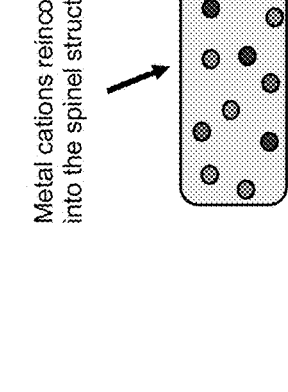

FIG. 8A

Conventional nickel catalyst

Active nickel nanoparticles

Alumina (Al₂O₃) support

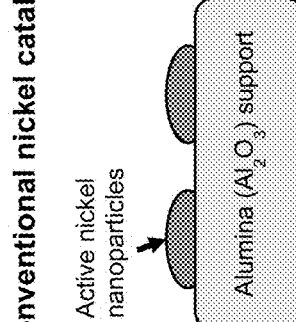

Regenerative oxidation

Metal cations reincorporate into the spinel structure

During dry reforming reaction

Valuable synthesis gas product (mixture of carbon monoxide and hydrogen)

Methane and carbon dioxide reactants

Bimetallic nanoparticles

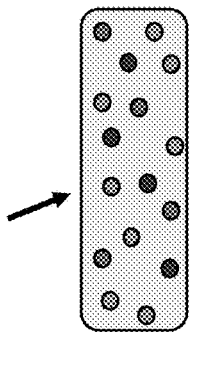

FIG. 8B

Multi-cationic aluminate catalyst

Metal cations homogeneously distributed in an aluminate spinel

Spent (CoMgNi)$_{0.75}$

Spent (CoNi)$_{0.67}$

MULTI-CATIONIC ALUMINATE SPINELS

CROSS-REFERENCE TO RELATED APPLICATION

This application claims the benefit of U.S. Provisional Application No. 63/337,232, filed May 2, 2022, which is incorporated herein by reference.

STATEMENT OF GOVERNMENT INTEREST

This invention was made with Government support under Contract No. DE-NA0003525 awarded by the U.S. Department of Energy/National Nuclear Security Administration. The Government has certain rights in the invention.

FIELD OF THE INVENTION

The present invention relates to high entropy oxides and, in particular, to multi-cationic aluminate spinels.

BACKGROUND OF THE INVENTION

High entropy oxides (HEOs) are a relatively new class of materials containing multiple cations (typically four or more) consolidated into a single-phase crystal structure. These structures are stabilized through configurational entropy (Se), which increases with the number of unique arrangements of cations and anions within the crystal structure according to Equation 1, $$S_c = -k_B \left[ \left( \sum_{i=1}^{N} x_i \ln(x_i) \right)_{cation} + \left( \sum_{j=1}^{M} y_j \ln(y_j) \right)_{anion} \right] \quad (1)$$

where $x_i$ and $y_j$ are mole fractions of each cationic and anionic specie, respectively, and N and M are the total number of unique cationic and anionic species, respectively. See C. M. Rost et al., *Nat. Commun.* 6, 8485 (2015). For a given N and M, $S_c$ is maximized when species are in equimolar concentration. The tendency of constituent cations to adopt dissimilar secondary oxide phases is overcome when increased entropy outweighs enthalpic energy penalties associated with mixing, according to the Gibbs equation ($\Delta G = \Delta H - T\Delta S$). High entropy oxides which exhibit this thermodynamic phenomenon are further distinguished as entropy-stabilized oxides. Previous studies report HEOs adopting a variety of different crystal structures, including rock salt, fluorite, spinel, and perovskite, which have demonstrated advantageous ionic conductivity, thermal conductivity, dielectric constants, and catalytic properties. See C. M. Rost et al., *Nat. Commun.* 6, 8485 (2015); A. Sarkar, et al., *Nat. Commun.* 9, 3400 (2018); J. Gild et al., *J. Eur. Ceram. Soc.* 38, 3578 (2018); M. R. Chellali et al., *Scr. Mater.* 166, 58 (2019); Z. Grzesik et al., *J. Eur. Ceram. Soc.* 40, 835 (2020); D. Wang et al., *J. Mater. Chem. A* 7, 24211 (2019); Y. Zhang et al., *ACS Appl. Mater. Interfaces* 12, 32548 (2020); R. Banerjee et al., *ACS Sustain. Chem. Eng.* 8, 17022 (2020); A. Sarkar et al., *J. Eur. Ceram. Soc.* 38, 2318 (2018); D. Bérardan et al., *J. Mater. Chem. A* 4, 9536 (2016); D. Bérardan et al., *Phys. Status Solidi Rapid Res. Lett.* 10, 328 (2016); H. Chen et al., *J. Mater. Chem. A* 6, 11129 (2018); and C. Riley et al., *ACS Appl. Mater. Interfaces* 13, 8120 (2021). These oxides are stabilized solely by increasing the number of cationic elements mixed together and increasing the temperature until a phase pure structure formed. Despite recent development of complex perovskite and transition metal spinel HEOs, many of these studies focused on stoichiometric crystal structures having a single equivalent cationic site, an approach which ultimately limits the number of parameters available to design unique complex oxides. See Z. Grzesik et al., *J. Eur. Ceram. Soc.* 40, 835 (2020); J. Dabrowa et al., *Mater. Lett.* 216, 32 (2018); and J. Dabrowa et al., *Materials (Basel)* 14, 5264 (2021).

SUMMARY OF THE INVENTION

The present invention is directed to a multi-cationic aluminate spinel, comprising at least three different divalent metal cations in nominally equimolar concentrations in an aluminate spinel crystal structure. The multi-cationic aluminate spinel can comprise a stoichiometric amount of at least four different divalent metal cations in nominally equimolar concentrations. Alternatively, the multi-cationic aluminate spinel can comprise sub-stoichiometric amounts of the at least three different divalent metal cations in nominally equimolar concentrations to a concentration unoccupied vacancy sites. The divalent metal cations can be selected from a group consisting of alkaline-earth metals, such as magnesium and calcium, and transition metals, such as cobalt, copper, manganese, nickel, chromium, iron, and zinc, which are known to produce metal aluminate spinels.

The invention is further directed to a method of dry reforming of methane, comprising providing the Ni-based multi-cationic aluminate spinel catalyst, and exposing a stream comprising methane and carbon dioxide to the Ni-based multi-cationic aluminate spinel catalyst at an elevated temperature, thereby catalytically reacting the methane and carbon dioxide to produce a synthesis gas. Although the reaction can occur at temperatures as low as 400° C., the reaction temperature is preferably greater than 600° C. to achieve significant conversion of methane and carbon dioxide. The exposed, spent Ni-based multi-cationic aluminate spinel catalyst can be regenerated under oxidizing conditions.

Complex aluminate spinels stabilized with cation vacancies are a new high entropy oxide material system. The unique ability of aluminate spinels to accommodate large deviations below stoichiometry enables vacancy-contributed configurational entropy. Cationic and anionic vacancies, as well as cation inversion, contribute to configurational entropy and aid the stabilization of phase pure complex spinel oxides. Entropy effects, as well as sol-gel synthesis, significantly lowers the processing temperature required to form phase pure spinels compared to conventional oxides produced through solid-state reactions. Incorporation of high cation vacancy concentrations and multiple divalent metals yields highly tunable structural, chromatic, and chemical properties. These properties enhance the potential of high entropy and sub-stoichiometric spinels as unique pigments, photo absorbents, refractories, and catalysts. Finally, the concept of vacancy-stabilized high entropy oxides can be applied to other non-stoichiometric complex oxides with crystal structures having multiple cationic lattice sites, including other spinel, perovskite, and pyrochlore material systems.

BRIEF DESCRIPTION OF THE DRAWINGS

The detailed description will refer to the following drawings, wherein like elements are referred to by like numbers.

FIG. 8A is a schematic illustration of a dry reforming of methane (DRM) reaction and oxidative regeneration of a convention nickel catalyst. FIG. 8B is a schematic illustration of a DRM reaction and oxidative regeneration of a multi-cationic aluminate spinel catalyst.

DETAILED DESCRIPTION OF THE INVENTION

Figure 1:
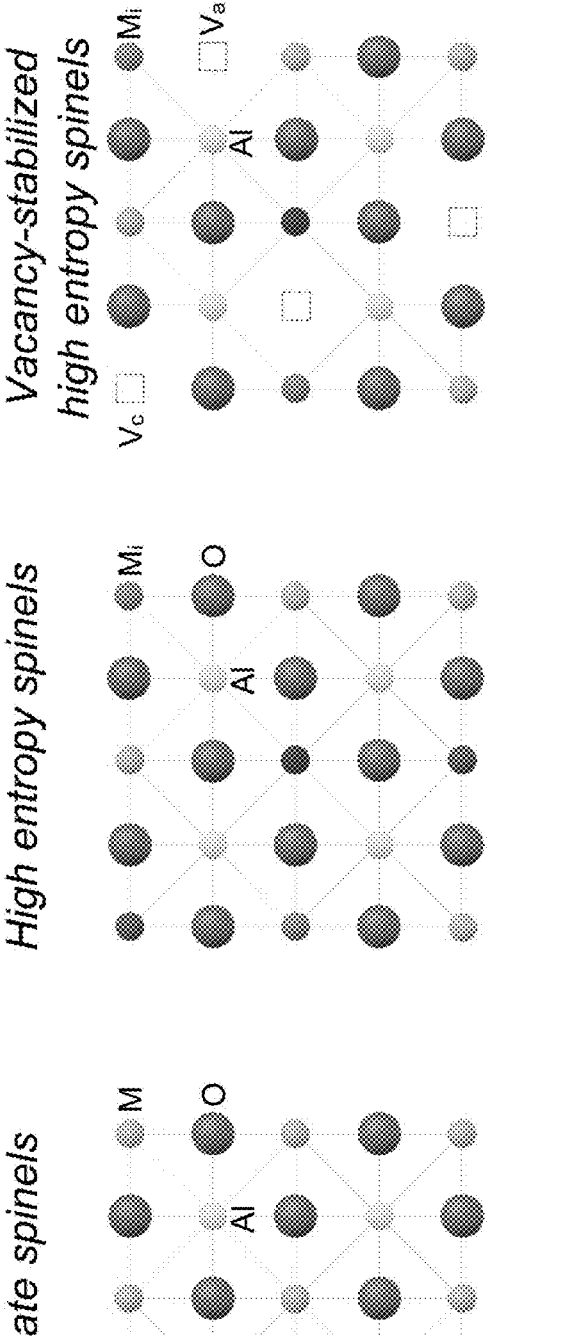
FIG. 1 is a schematic illustration of an aluminate spinel, a high entropy aluminate spinel comprising five different cations, and a vacancy-stabilized high entropy aluminate spinel comprising both cationic and anionic vacancies.

The present invention is directed to both stoichiometric and sub-stoichiometric high entropy aluminate spinels as a novel high entropy oxide (HEO) crystal phase. An aspect of the invention is directed to the stabilization of HEOs with cationic vacancies. From a configurational entropy perspective, site vacancies constitute a unique chemical specie that increases the number of unique atomic configurations within a crystal lattice in the same manner as a cation. See O. F. Dippo and K. S. Vecchio, *Scr. Mater.* 201, 113974 (2021); and A. Sarkar et al., *Scr. Mater.* 187, 43 (2020). Unfortunately, most metal oxide crystal structures do not support large vacancy concentrations, preventing their systematic study. Aliovalent cation dopant incorporation and oxygen partial pressure change are shown to induce vacancies in both compositionally simple and high entropy oxides. See Y. Zhang et al., *ACS Appl. Mater. Interfaces* 12, 32548 (2020); D. Bérardan et al., *J. Mater. Chem. A* 4, 9536 (2016); C. Riley et al., *ACS Appl. Mater. Interfaces* 13, 8120 (2021); B. Bulfin et al., *Phys. Chem. Chem. Phys.* 18, 23147 (2016); and R. Djenadic et al., *Mater. Res. Lett.* 5, 102 (2016). However, vacancy concentrations induced through these methods are typically too low to significantly increase configurational entropy. See F. Yuan et al., *J. Phys. Chem. C* 119, 13153 (2015); and A. M. Ferrari et al., *J. Chem. Phys.* 127, 174711 (2007). Since crystallographic defects are known to enhance many of the useful properties of metal oxides (ionic conductivity, energy storage, and catalytic activity, for instance), a systematic study of defect-stabilized HEOs would be valuable. See C. Riley et al., *ACS Appl. Mater. Interfaces* 13, 8120 (2021); M. Moździerz et al., *Acta Mater.* 208, 116735 (2021); and X. Liu et al., *Small* 18, e2200524 (2022). Further, cationic vacancies are accompanied by charge-compensating anionic vacancies, enabling a configurational entropy contribution from the anionic sublattice, which is typically assumed to be zero in metal oxides. See C.-J. Ting and H.-Y. Lu, *J. Am. Ceram. Soc.* 82, 841 (1999); and N. Osenciat et al., *J. Am. Ceram. Soc.* 102, 6156 (2019). High entropy carbides, silicides, borides, and sulfides offer an alternative to oxygen anions in compositionally complex materials. See E. Castle et al., *Sci. Rep.* 8, 8609 (2018); P. Sarker et al., *Nat. Commun.* 9, 4980 (2018); J. Gild et al., *J. Materiomics* 5, 337 (2019); Y. Qin et al., *J. Adv. Ceram.* 8, 148 (2019); J. Gild et al., *Sci. Rep.* 6, 37946 (2016); Y. Zhang et al., *J. Eur. Ceram. Soc.* 39, 3920 (2019); Y. Zhang et al., *Scr. Mater.* 164, 135 (2019); R. Z. Zhang et al., *Inorg. Chem.* 57, 13027 (2018); C. R. McCormick and R. E. Schaak, *J. Am. Chem. Soc.* 143, 1017 (2021); and M. Cui et al., *Adv. Energy Mater.* 11, 2002887 (2020). Several studies of high entropy carbides demonstrate significant anionic vacancy concentrations shown to stabilize the carbide structure, which suggests the same principle may stabilize other material systems, like metal oxides. See C. Peng et al., *J. Mater. Sci. Technol.* 51, 161 (2020); and Y. He et al., *J. Mater. Sci.* 55, 6754 (2020). However, a method for supporting high vacancy concentrations is lacking in previously studied HEOs.

More particularly, the present invention is directed to HEOs having an aluminate spinel crystal structure. FIG. 1 is a simplified illustration of spinel crystal structures, including an aluminate spinel $(MAl_2O_4)$, a high entropy aluminate spinel comprising five different divalent metal cations ($M_i$), and a vacancy-stabilized aluminate spinel comprising vacancies occupying both cationic ($V_c$) and anionic ($V_a$) sites. These spinels are $AB_2O_4$ type oxides in which A-site cations have tetrahedral coordination and B-site cations have octahedral coordination. Stoichiometric aluminate spinels have $MAl_2O_4$ composition, where M is a divalent metal cation. However, previous studies observed that aluminates with divalent cation concentrations significantly below stoichiometric values retained a spinel crystal structure by accommodating cationic site vacancies and charge-compensating oxygen vacancies. See Y. Li et al., *Ceram. Int.* 44, 15104 (2018); S. Zhang et al., *Appl. Catal. B* 291, 120074 (2021); and M. Gil-Calvo et al., *Appl. Catal. B* 209, 128 (2017). In fact, γ-alumina, a common $Al_2O_3$ phase having no divalent cations, adopts a defected spinel structure containing site vacancies. See R. Prins, *J. Catal.* 392, 336 (2020); and M. Lee et al., *Chem. Phys. Left.* 265, 673 (1997). Thus, these materials are uniquely suited for increased vacancy-contributed configurational entropy. The presence of two cationic sublattices also enables site inversion, a unique structural feature that can increase configurational entropy. See H. St. C. O'Neill et al, *Phys. Chem. Miner.* 18, 302 (1991); and J. Yan et al, *Ceram. Int.* 45, 14073 (2019). Inversion occurs when divalent cations occupy octahedral sites instead of tetrahedral, and trivalent cations occupy tetrahedral sites instead of octahedral. The inversion parameter describes the extent to which this phenomenon occurs and is given as x in the formula $(A_{1-x}B_x)(B_{2-x}A_x)O_4$ for stoichiometric spinels, where x=0 in normal spinels and x=1 in fully inverse spinels. Although $Al^{3+}$ ions prefer octahedral coordination, the energetics of divalent cations often dictate site occupation of both cations within a spinel structure. See D. McClure, *J. Phys. Chem. Solids* 3, 311 (1957); and B. Lavina et al., *Phys. Chem. Miner.* 29, 10 (2002). $Ni^{2+}$ and $Cu^{2+}$ energetically favor octahedral site occupation and form inverse aluminate spinels, but $CuAl_2O_4$ with highly disordered normal spinel structure has also been observed. See H. St. C. O'Neill et al., *Eur. J. Mineral.* 17, 581 (2005). On the other hand, $Mn^{2+}$ and $Co^{2+}$ show little energetic preference, and $Mg^{2+}$ favor tetrahedral sites. See D. McClure, *J. Phys. Chem. Solids* 3, 311 (1957). Accounting for site vacancies and cation inversion, a formula for configurational entropy for non-stoichiometric spinels is given as Equation 2. Non-zero configurational entropy contributions from two cationic and an anionic sublattice clearly offers a unique opportunity for entropic stabilization within complex spinels, which is inaccessible in many previously studied HEO materials.

$$S_c = \qquad\qquad (2)$$
$$-k_B\left[\left(\sum_{i=1}^{N} x_i\ln(x_i)\right)_{\substack{A-site \\ cation}} + \left(\sum_{i=1}^{N} x_i\ln(x_i)\right)_{\substack{B-site \\ cation}} + \left(\sum_{j=1}^{M} y_j\ln(y_j)\right)_{anion}\right]$$

As an example of the invention, aluminate spinels were produced with increasing numbers of divalent cationic species, including Co, Cu, Mg, Mn, and Ni ions, and cationic vacancies in varying combinations. Cationic vacancies were induced by using metal precursors with $M^{2+}:Al^{3+}$ ratios<0.5 in a facile sol-gel synthesis. Stoichiometric and sub-stoichiometric samples containing one to five cationic species were systematically heated from 800-950° C. and measured for phase purity. Sample XRD patterns were compared to those generated from modeled spinel crystal structures to determine average cationic site occupation and vacancy concentration, similar to methods reported in previous literature. See J. Yan et al, *Ceram. Int.* 45, 14073 (2019); and R. F. Cooley and J. S. Reed, *J. Am. Ceram. Soc.* 55, 395 (1972). Due to the relatively high energetic barrier for $NiAl_2O_4$ formation, the examples described below primarily relate to spinels containing Ni. Samples were evaluated for chromatic, chemical, thermal, and catalytic properties, which are relevant to the primary applications of aluminate spinels as aesthetic pigments, catalysts, and refractory materials. See M. Gaudon et al., *Ceram. Int.* 40, 5201 (2014); G. Buvaneswari et al., *Dyes Pigm.* 123, 413 (2015); S. Zhang et al., *Appl. Catal. B* 291, 120074 (2021); and H. Tang et al.,

*Materials(Basel)* 14, 3050 (2021). These properties are highly tunable through the inclusion of both multiple divalent cations and cationic vacancies, as compared to simple spinels.

Synthesis of Aluminate Spinels

Spinel samples were synthesized through a sol-gel synthesis previously reported, with several adjustments. See C. Riley et al., *ACS Appl. Mater. Interfaces* 13, 8120 (2021); C. Riley et al., *ChemCatChem* 11, 1526 (2019); and C. Riley et al., *Appl. Catal. B* 264, 118547 (2020). First, 5 g of poly-vinylpyrrolidone was dissolved in 100 ml of DI water under vigorous stirring. Metal nitrate precursors were then added to the polymer solution and stirred for 1 hour. A total of 7 mmol of divalent metal nitrates were added to make stoichiometric spinels or less than 7 mmol for sub-stoichiometric spinels. Divalent metal precursors included cobalt (II) nitrate hexahydrate, copper (II) nitrate hemipentahydrate, magnesium (II) nitrate, manganese (II) nitrate tetrahydrate, and nickel (II) nitrate hexahydrate. 14 mmol of aluminum (III) nitrate nonahydrate was added. The resulting solutions were heated at 110° C. overnight to evaporate water and form hard gels. These gels were crushed to a coarse powder and placed in the center of a vented box furnace preheated at 800° C. for 2 hours to calcine within a fume hood. One set of samples was subjected to the same calcination parameters but with ramp rates of 5 and 25° C./min to evaluate this effect on phase purity. Calcined samples containing secondary oxide phases were further heated at temperatures between 850 and 950° C. for 2 hours followed by quenching in ambient air to demonstrate the effect of temperature on phase pure spinel formation. For simplicity, spinel samples are labeled herein according to the constituent divalent metals and their nominal concentration. Parentheses are used to designate equimolar concentrations of the enclosed elements, which are listed in alphabetical order. For instance, stoichiometric spinel containing only nickel is labeled $Ni_1$, and stoichiometric spinel containing both nickel and magnesium is labeled $(NiMg)_1$. Sub-stoichiometric spinels are labeled with A-site cation stoichiometry values less than 1, such as for the sample having equimolar concentrations of nickel, magnesium, and cationic vacancies labeled as $(NiMg)_{0.67}$, wherein 1/3 of A-sites are assumed to be vacant. Where appropriate, samples are also labeled with the highest heat treatment temperature used to compare the effect of aging on single phase formation. Otherwise, samples labeled without a temperature underwent 800° C. calcination as the sole heat treatment.

Characterization of Aluminate Spinels

Figure 2B:
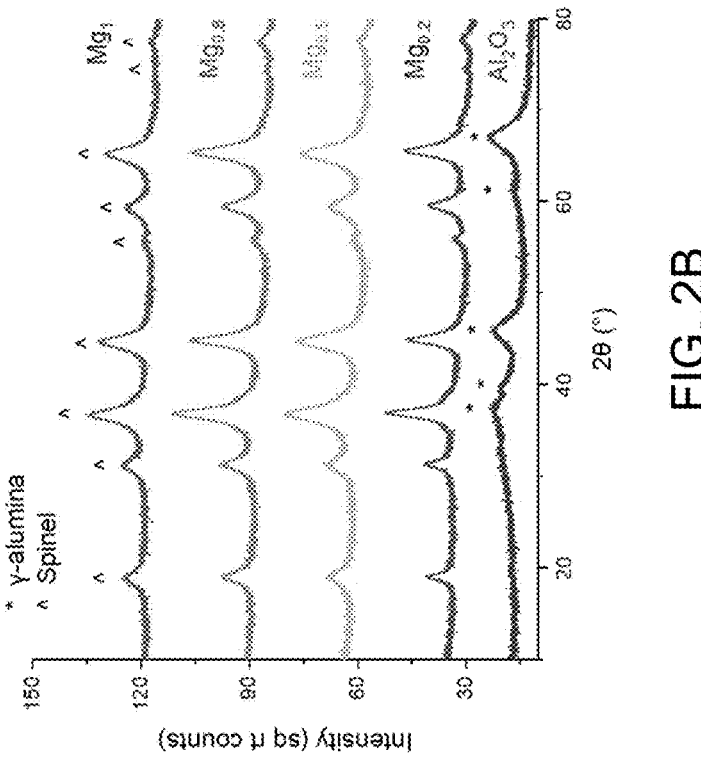
FIG. 2B shows XRD patterns of alumina and magnesium aluminates with varying Mg stoichiometry all calcined at 800° C.
Figure 2A:
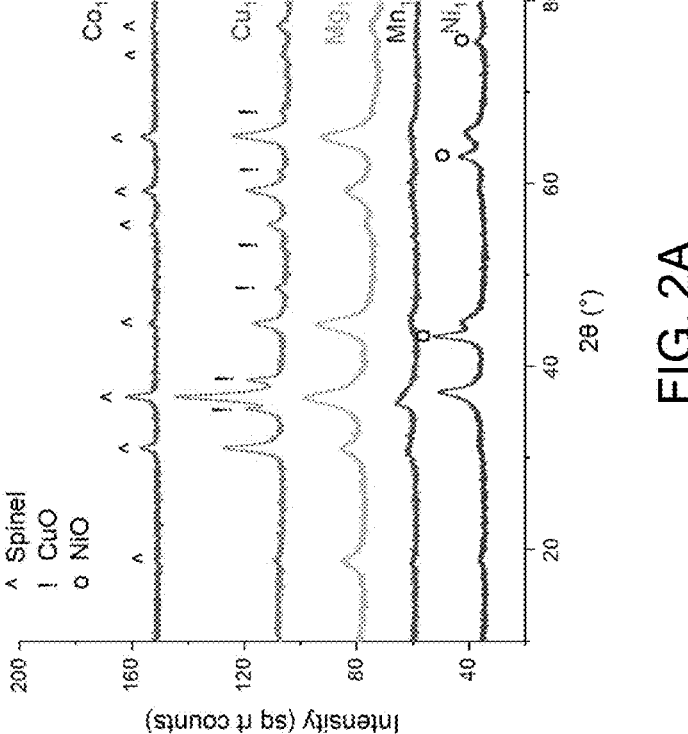
FIG. 2A shows x-ray diffraction (XRD) patterns of stoichiometric simple spinels.

Initial characterization results yielded compositional and structural information of spinel samples containing a single divalent cation in nominal stoichiometric ratio to aluminum. XRD patterns of these samples are shown in FIG. 2A. Data are plotted as the square root of intensity to enhance the visibility of any peaks corresponding to low concentrations of secondary oxide phases. As with previous HEO studies, the cationic constituents added here demonstrate varying tendency to form secondary oxide phases dissimilar to that of the spinel structure. See C. M. Rost et al., *Nat. Commun.* 6, 8485 (2015). $Co_1$ and $Mg_1$ samples calcined at 800° C. adopt phase pure $CoAl_2O_4$ and $MgAl_2O_4$ spinel structures, respectively, while $Cu_1$ and $Ni_1$ samples contained segregated oxide phases. $Cu^{2+}$ and $Ni^{2+}$ ions have a higher preference for octahedral site occupancy than do $Co^{2+}$ and $Mg^{2+}$. See D. McClure, *J. Phys. Chem. Solids* 3, 311 (1957). Enthalpies of formation ($\Delta H_f$) of $CuAl_2O_4$ and $NiAl_2O_4$ are also notably higher than for $CoAl_2O_4$ and $MgAl_2O_4$, which accounts for segregation of CuO and NiO phases under initial synthesis conditions. See A. Navrotsky and O. Kleppa, *J. Inorg. Nucl. Chem.* 30, 479 (1968). $Mn_1$ shows poor crystallinity, as evidenced by broad peaks of low intensity. The low intensity of the $Co_1$ sample is likely a result of fluorescence from cobalt, which raises the background signal. Table I lists electron probe microanalysis (EPMA) compositional data, showing that the actual concentrations of divalent cations were near nominal values. Since Mg showed a tendency to form a phase-pure spinel, a series of samples with varying Mg concentration were produced to demonstrate the ability to form sub-stoichiometric compounds. As shown in FIG. 2B, the pure alumina sample synthesized without divalent metal addition has $\gamma$-$Al_2O_3$ phase in which $Al^{3+}$ ions are known to favor octahedral sites. See M. Lee et al., *Chem. Phys. Lett.* 265, 673 (1997). Samples with Mg stoichiometry from 0.2-1 all adopted a phase pure spinel structure. This result verifies that alum inate spinels accommodate large deviations from stoichiometry and thus large cation vacancy concentrations. These findings are corroborated by previous studies. See S. Zhang et al., *Appl. Catal. B* 291, 120074 (2021); and M. Gil-Calvo et al., *Appl. Catal. B* 209, 128 (2017).

$Mn_3O_4$. According to crystal field theory, $Mn^{2+}$ ions can occupy tetrahedral and octahedral sites with no energetic preference but with different Mn—O bond lengths, which explains why two unique spinel crystal structures with distinct peak locations and lattice parameters coexist within the $Mn_1$ sample. See D. McClure, *J. Phys. Chem. Solids* 3, 311 (1957). Lattice parameter and average crystallite size are listed for the predominant $MnAl_2O_4$ phase in Table I. While aging at elevated temperature was effective in producing phase pure spinels, samples were prone to sintering. $Ni_1$ calcined at 800° C. had a surface area of 117 $m^2$/g, which dropped to 52 $m^2$/g after heating at 950° C. Such effects hamper performance of spinels in surface-mediated applications, like catalysis, which incentivizes production of spinels at lower temperatures. This effect has been achieved in previous HEO studies through mixing of additional cations. See C. M. Rost et al., *Nat. Commun.* 6, 8485 (2015).

To promote configurational entropy through cationic mixing, a set of nickel-containing spinels was synthesized with multiple divalent metals. These stoichiometric samples were all calcined at 800° C. and included $Ni_1$, $(MgNi)_1$, $(CoMgNi)_1$, $(CoCuMgNi)_1$, and $(CoCuMgMnNi)_1$, with the

TABLE I

Physical characterization of stoichiometric spinels with a single divalent cation.

| Sample | $M^{2+}$ composition (x in $M_xAl_2O_4$) | Calcination temperature (° C.) | Lattice parameter $(\text{Å})^a$ | Average crystallite size $(\text{nm})^a$ | Surface area $(m^2/g)$ |
|---|---|---|---|---|---|
| $Co_1$ | 0.99 | 800 | 8.095 | 19.4 | 52 |
| $Cu_1$ | 1.03 | 950 | 8.091 | 20.6 | 8 |
| $Mg_1$ | 0.90 | 800 | 8.078 | 5.8 | 95 |
| $Mn_1$ | 1.06 | 950 | $8.084^b$ | $7.4^b$ | 29 |
| $Ni_1$ | 0.87 | 950 | 8.060 | 9.4 | 58 |

Figure 3B:
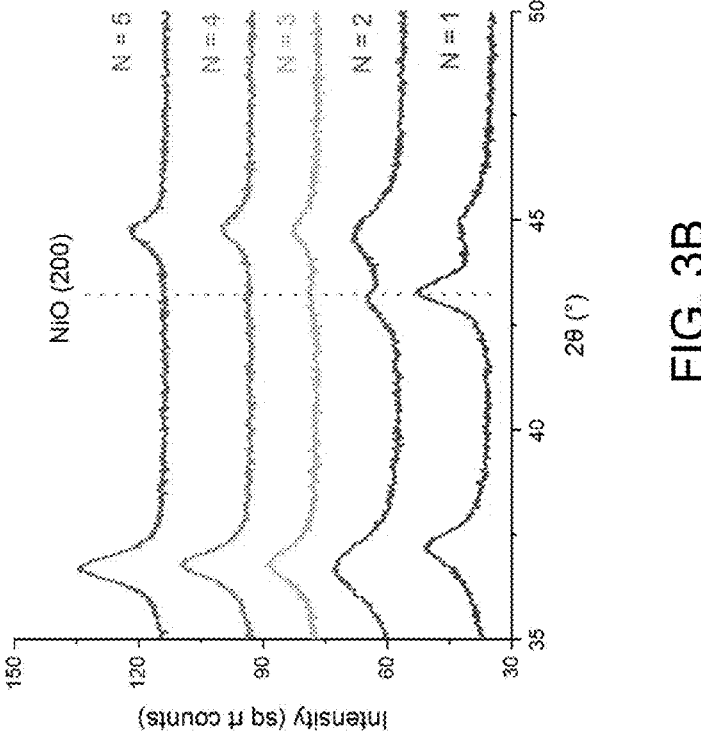
FIGS. 3A and 3B show XRD patterns of stoichiometric spinels containing varying numbers of divalent metal cations.
Figure 3A:
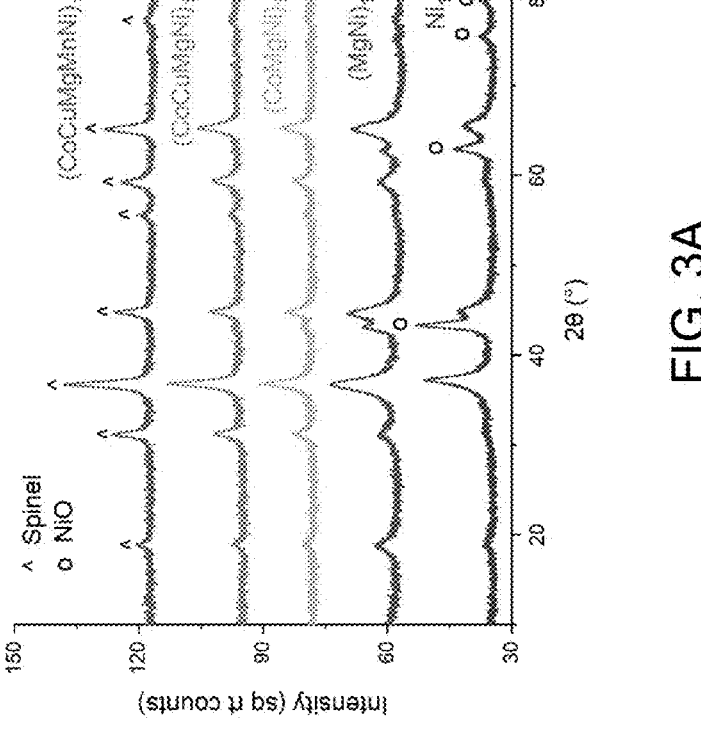
Figure 4:
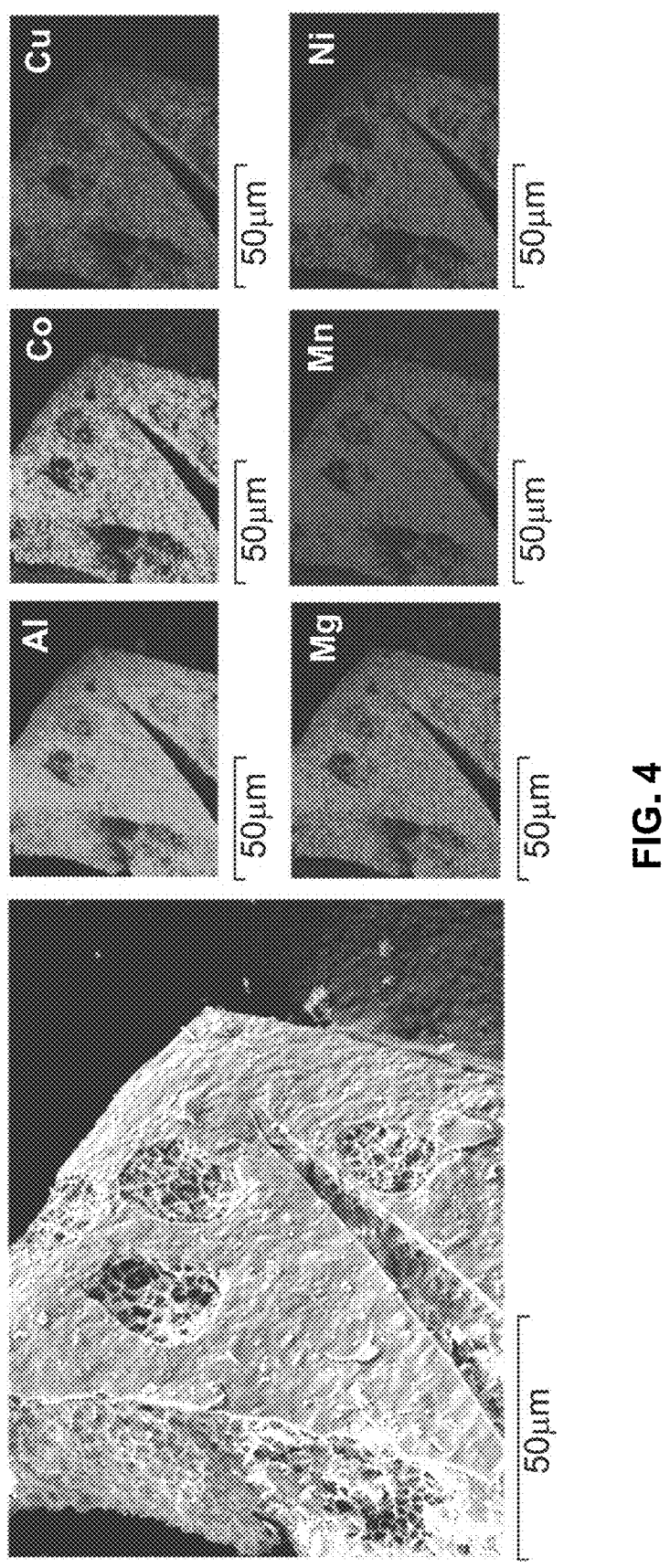
FIG. 4 shows a scanning electron microscopy (SEM) image (left) and elemental mapping (right) of the $(CoCuMgMnNi)_1$ sample showing a morphologically porous, compositionally homogeneous microstructure. Scale marker is 50 μm.

$^a$Lattice parameters and average crystallite sizes listed correspond to $MAl_2O_4$ phase $^b$Values are given for the predominant $MAl_2O_4$ phase The effects of heat treatment and the number of divalent cationic species (N) on entropic stabilization of single-phase stoichiometric spinels was evaluated. $Cu_1$, $Mn_1$, $Ni_1$ samples previously calcined at 800° C. all showed secondary oxide phases. These samples were next calcined at 900 and 950° C. for 2 hours, followed by quenching in ambient air. XRD patterns indicated that calcination at 950° C. followed by quenching was sufficient to create phase pure $NiAl_2O_4$ and $CuAl_2O_4$ structures. Raman spectra of the $Ni_1$-800° C. and $Ni_1$-950° C. showed vibrational features corresponding to the $NiAl_2O_4$ phase. See Y. Gao et al., *Catal. Lett.* 150, 3617 (2020). However, a peak near 1100 $cm^{-1}$ corresponding to a multi-phonon scattering mode of NiO was present in the sample calcined at 800° C., but was absent in the sample calcined at 950° C. See N. Mironova-Ulmane et al., *J. Phys. Conf. Ser.* 93, 012039 (2007). The peaks of quenched $Cu_1$ were asymmetric, indicating a distribution of unit cell sizes skewed toward larger dimensions, which is likely caused by non-equilibrium mixed cation site occupation retained through rapid sample cooling. Secondary oxide phases segregated when these samples were allowed to cool slowly within the furnace, as opposed to quenched. Previous studies observed this behavior within entropically stabilized materials and was demonstrated through XRD patterns of the $Ni_1$ sample. Even after aging at 950° C., $Mn_1$ samples contained multiple phases, including two distinct $MnAl_2O_4$ phases and corresponding number of cationic species being N=1 through N=5. XRD patterns in FIGS. 3A and 3B show the diminishing presence of NiO with increasing N. Rietveld refinements confirmed the presence of segregated NiO in $(CoMgNi)_1$, but the absence of this phase in $(CoCuMgNi)_1$. The pattern of $(CoCuMgMnNi)_1$ additionally showed no phases other than aluminate spinel. SEM-EDS mapping of this sample indicates a homogeneous distribution of all constituent elements, as shown in FIG. 4. EPMA analysis further confirmed that actual compositions were near equimolar values, as shown in Table II. The effect of calcination parameters was evaluated by comparing the structure of $(CoCuMgNi)_1$ samples all heated to 800° C. but at varying ramp rates (5° C./min, 25° C./min, and with placement in a preheated furnace). All three structures were phase pure with no significant structural differences observed via XRD patterns, suggesting that a phase pure high entropy spinel is indeed thermodynamically favored at this calcination temperature. By raising entropy via increased temperature and/or number of cationic constituents, enthalpic penalties for nickel aluminate formation were overcome, resulting in stabilization of phase pure spinel HEOs. Further, the sol-gel synthesis enabled compositionally homogeneous oxide formation through aqueous precursor mixing, negating high temperature solid-state mixing protocols common in HEO studies.

TABLE II

Physical characterization of stoichiometric spinels with multiple divalent cations.

| Sample | Divalent metal stoichiometry | | | | | Lattice parameter (Å) | Average crystallite size (nm) |
|---|---|---|---|---|---|---|---|
| | Co | Cu | Mg | Mn | Ni | | |
| $Ni_1$ | — | — | — | — | 0.87 | 8.060 | 9.4 |
| $(MgNi)_1$ | — | — | — | — | — | 8.070 | 14.1 |
| $(CoMgNi)_1$ | 0.33 | — | 0.39 | — | 0.33 | 8.069 | 8.5 |
| $(CoCuMgNi)_1$ | 0.26 | 0.26 | 0.23 | — | 0.26 | 8.073 | 11.2 |
| $(CoCuMgMnNi)_1$ | 0.20 | 0.18 | 0.28 | 0.21 | 0.20 | 8.089 | 12.0 |

Vacancy-Stabilized Aluminate Spinels

Next, sub-stoichiometric spinels were synthesized with 800° C. calcination and characterized. Ni-containing spinels were again studied, and cationic elements were added in the same order as in the previous set of samples. However, the ratio of total divalent cations to $Al^{3+}$ was <0.5, and the concentration of each divalent element was kept equimolar to the concentration of unoccupied divalent cation sites, assuming these divalent species occupy A-sites only. The resulting samples were $Ni_{0.5}$, $(MgNi)_{0.67}$, $(CoMgNi)_{0.75}$, and $(CoCuMgNi)_{0.8}$. Compositions, lattice parameters, and average crystallite sizes of these oxides are listed in Table III. Total divalent metal cation concentrations are clearly below stoichiometric values, due to vacancy inclusion. Divalent species and vacancies are in nominally equimolar concentrations. Although entropy is maximized when the species are in equimolar concentration, according to Equation 1, the results in Tables II and III indicate that entropic stabilization can be achieved with molar concentrations that deviate from strictly equimolar (e.g., by ±40% of the equimolar concentration). Indeed, for catalyst applications, it may be beneficial to have catalytically active species present in higher concentrations. At any rate, elemental concentrations should not be so dissimilar that they can no longer be consolidated into a single crystal phase through thermal treatments.

Figure 3D:
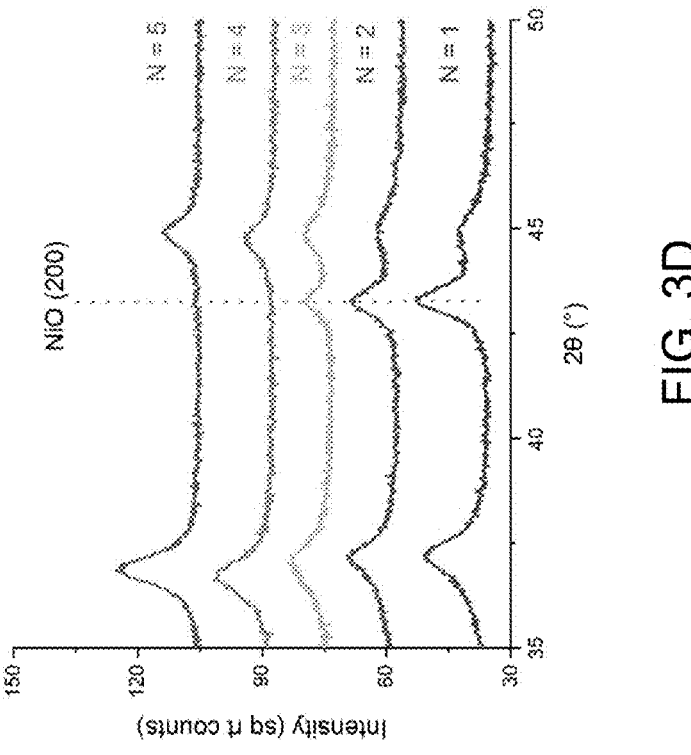
FIGS. 3C-3F show XRD patterns of sub-stoichiometric spinels containing cationic vacancies. All samples shown were calcined at 800° C.
Figure 3C:
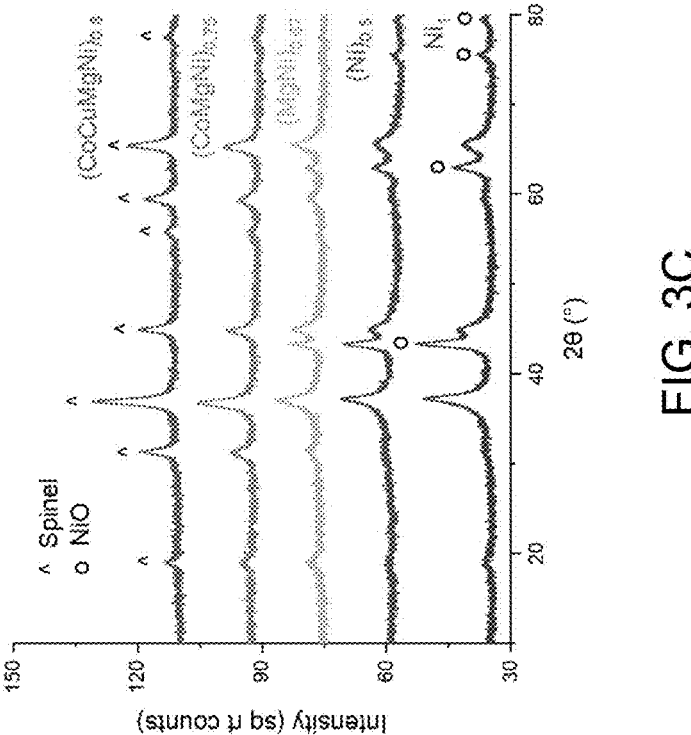
Figure 3F:
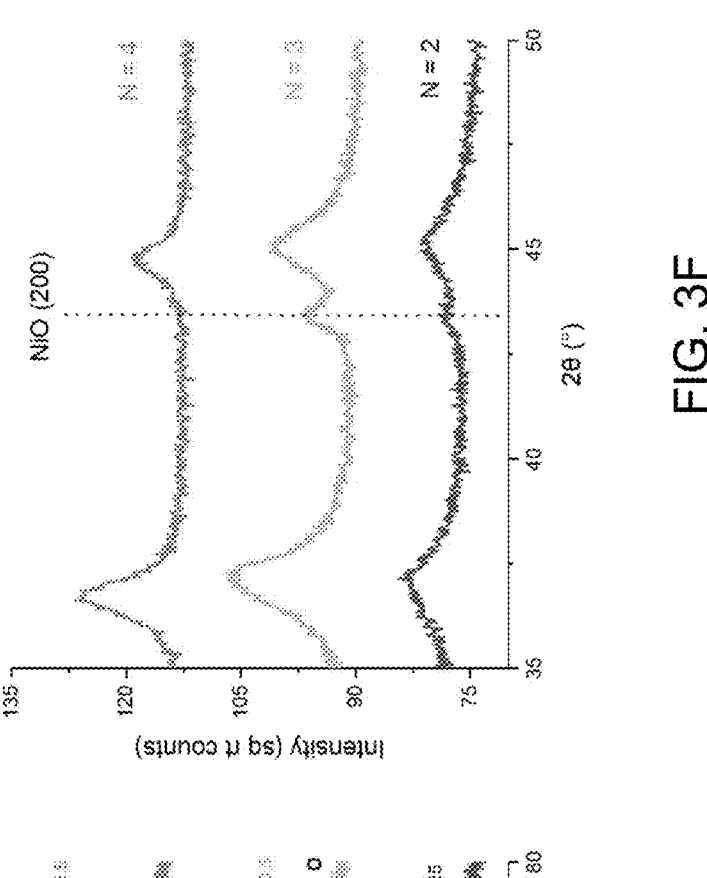
Figure 3E:
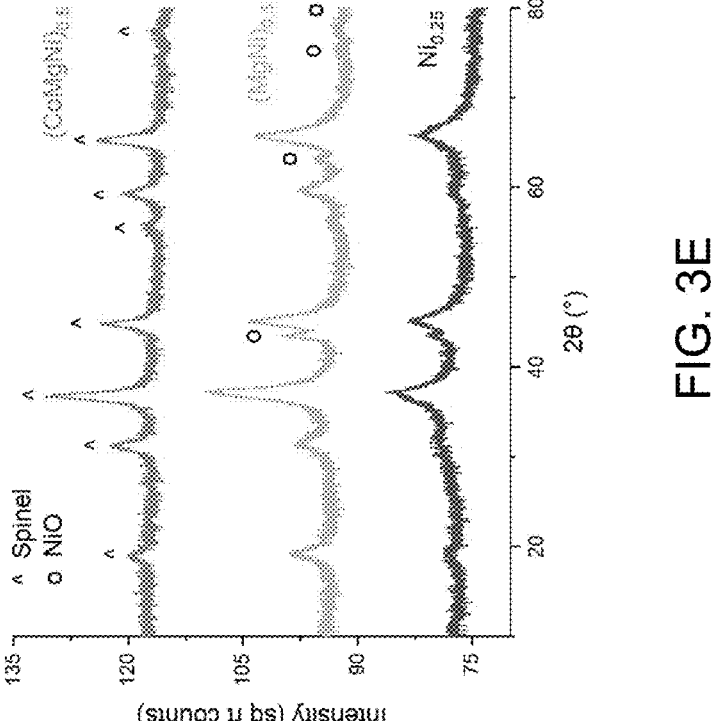
Figures 5A, 5B:
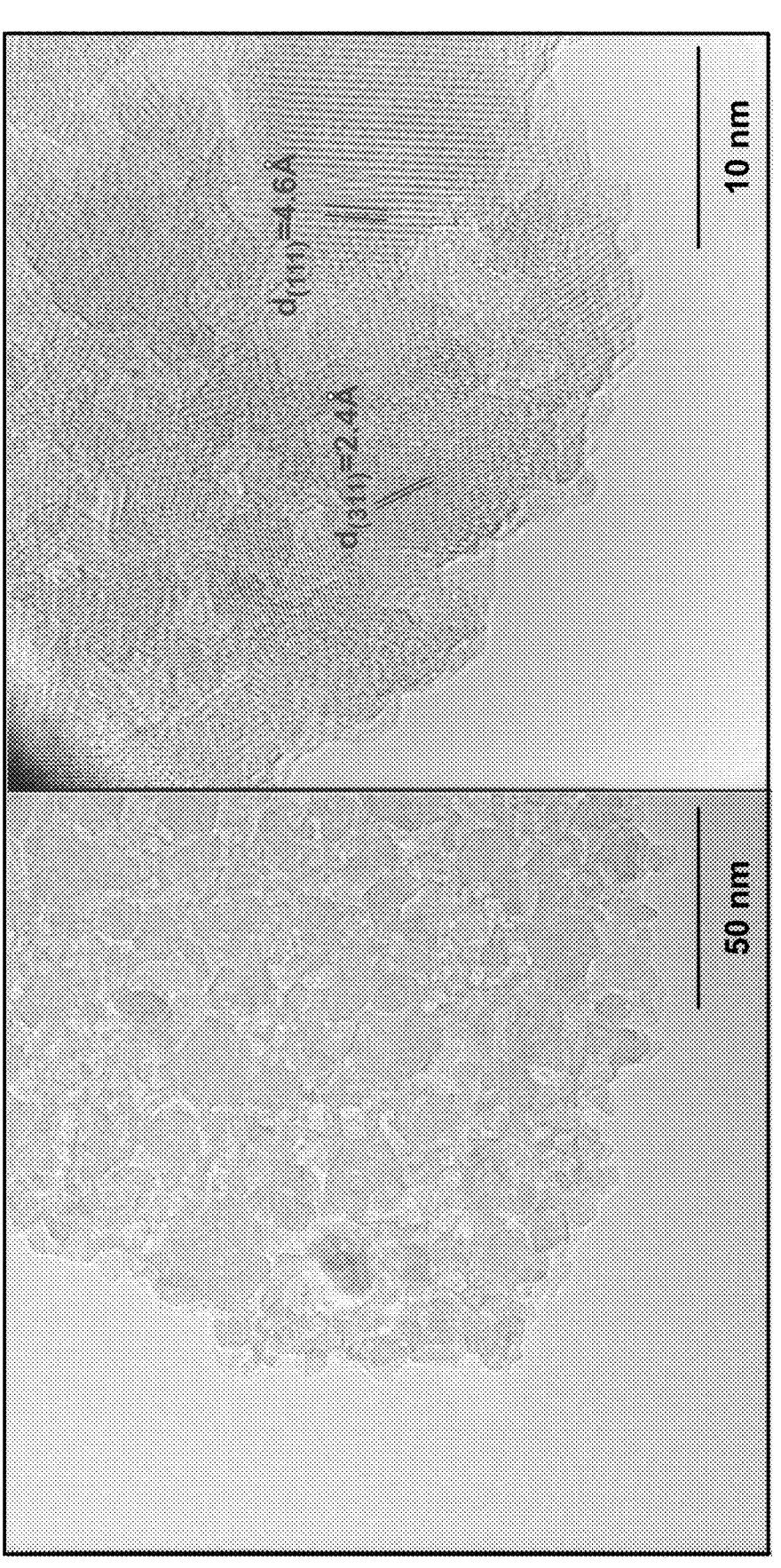
FIG. 5A is a transmission electron microscopy (TEM) image of the $(CoMgNi)_{0.75}$ sample showing nanostructure morphology at lower magnification.
FIG. 5B is a TEM image at higher magnification showing interplanar spacing of confirmed spinel planes.

FIGS. 3C-3D show the corresponding XRD patterns. As with the stoichiometric spinels, segregated NiO phase is present in spinels having up to three cationic species. $(CoMgNi)_{0.75}$ and $(CoCuMgNi)_{0.8}$ samples having four and five cationic species, on the other hand, are phase pure. TEM imaging of the $(CoMgNi)_{0.75}$ sample confirmed a spinel structure composed of agglomerated nanoparticles, shown in FIGS. 5A and 5B. Interplanar distances in the lattice fringes measured with ImageJ software were 4.6 and 2.4 Å, which can be indexed to the (111) and (311) planes, respectively, of the nickel and magnesium aluminate spinels.

the integration of kinetically slower species, leading to segregated oxide phases. To rule out the competing effects of other divalent cations, $Ni_{0.25}$ and $(MgNi)_{0.5}$ samples were evaluated via XRD, as shown in FIGS. 3E-3F, which had lower Mg concentrations and higher vacancy concentrations than those previously shown in an effort to increase Ni diffusion rates. See G. Yamaguchi et al., *Bull. Chem. Soc. Jpn.* 42, 2801 (1969). Despite these factors, NiO segregation was evident in both $Ni_{0.25}$ and $(MgNi)_{0.5}$ samples, suggesting that Ni ions are not kinetically hindered from incorporating into the spinel lattice under these synthesis conditions. Detection of the NiO phase within the $Ni_{0.25}$ sample further excludes decreased nickel content as an explanation for the absence of detectable NiO peaks in XRD patterns of phase pure $(CoMgNi)_{0.75}$ and $(CoCuMgNi)_1$. However, segregation of NiO (even at low Ni loadings) is rational in the context of entropic stabilization, in that a lower number of cationic species and deviation from equimolar cation concentrations does not provide enough entropy to overcome the relatively high enthalpic terms associated with nickel aluminate phase formation. See A. Navrotsky and O. Kleppa, *J. Inorg. Nucl. Chem.* 30, 479 (1968). The persistent finding that four cationic species are required to stabilize phase pure Ni-containing spinels at the same temperature is consistent with the principles of entropic stabilization. Since this behavior is consistent between stoichiometric and sub-stoichiometric spinels, it can be concluded that cationic vacancies contribute to configurational entropy similarly to cations and can stabilize phase pure HEOs.

The structural features of select samples were further evaluated to estimate cationic and anionic site occupation. Measured XRD patterns were fit via Rietveld refinement and compared to simulated patterns with varying cation compositions and site occupancies, as demonstrated in previous literature. See J. Yan et al, *Ceram. Int.* 45, 14073 (2019); and T. Tangcharoen et al., *J. Mol. Struct.* 1182, 219 (2019). Because diffraction peak intensity is a function of the size

TABLE III

Physical characterization of sub-stoichiometric spinels with multiple divalent cations.

| Sample | Divalent specie stoichiometry | | | | $M^{2+}$ Vacancy | Calcination temperature (° C.) | Lattice parameter (Å) | Average crystallite size (nm) |
|---|---|---|---|---|---|---|---|---|
| | Co | Cu | Mg | Ni | | | | |
| $Ni_{0.5}$ | — | — | — | 0.49 | 0.51 | 950 | 8.033 | 4.2 |
| $(MgNi)_{0.67}$ | — | — | 0.42 | 0.28 | 0.30 | 900 | 8.061 | 6.7 |
| $(CoMgNi)_{0.75}$ | 0.24 | — | 0.32 | 0.25 | 0.19 | 800 | 8.082 | 8.5 |
| $(CoCuMgNi)_{0.8}$ | 0.2 | 0.18 | 0.27 | 0.21 | 0.14 | 800 | 8.076 | 13.9 |

In HEO spinels, divalent cations compete for limited available lattice sites, and varying diffusion rates could limit and electron density of atoms within a given crystallographic plane, relative peak intensities can be used to determine the distribution of cations occupying A and B sites. As exemplified by nickel aluminates, simulated patterns show variation in relative peak intensity, most notably between (111) and (220) peaks, when changing the relative site occupation of $Ni^{2+}$ and $Al^{3+}$ cations. Measured patterns of $Mg_1$ and $Ni_1$ samples were first evaluated, which are known to adopt normal and inverse spinel structures, respectively. As expected, Rietveld refinement indicates that all $Mg^{2+}$ ions occupy tetrahedral A-sites and all $Ni^{2+}$ ions occupy octahedral B-sites, while oxygen sites in these stoichiometric structures are completely filled, as shown in Table IV. This finding corroborates the entropic stabilization of $NiAl_2O_4$ observed in the heat treatment studies, as well as prior literature. See H. St. C. O'Neill et al, *Phys. Chem. Miner.* 18, 302 (1991). The presence of both $Al^{2+}$ and $Ni^{2+}$ ions in B-sites creates non-negligible configuration entropy. $Ni^{2+}$ ions occupy B-sites exclusively in non-stoichiometric $Ni_{0.75}$ and $Ni_{0.5}$ samples as well. Refinements of these patterns also indicate the presence of cationic and anionic vacancies. The total occupation of cationic and anionic sites decreases in spinels with low $Ni^{2+}:Al^{3+}$ ratios and indicates that the non-stoichiometric structures are highly defected. A decrease in spinel lattice parameter is also consistent with higher vacancy concentrations. See Y. Li et al., *Ceram. Int.* 44, 15104 (2018); and S. Zhang et al., *Appl. Catal. B* 291, 120074 (2021). Spinets containing multiple divalent cations are more difficult to model, and these species were treated as a single element with electron density that was the average of all divalent cationic species. As shown in Table IV, $Al^{3+}$ and $M^{2+}$ cations occupy both tetrahedral and octahedral sites within $(CoCuMgNi)_1$ and $(CoMgNi)_{0.75}$ samples. However, the degree of inversion is lower in these HEO spinels, with a majority of $M^{2+}$ ions occupying tetrahedral sites. This is expected with addition of $Mg^{2+}$ and $Co^{2+}$ ions, which have much higher energetic preference for tetrahedral site occupation than $Ni^{2+}$. See D. McClure, *J. Phys. Chem. Solids* 3, 311 (1957). Inclusion of both divalent cations that prefer normal and inverse spinel structures creates mixed occupations on both A and B lattice sites. The complex structures that result from multiple cationic constituent inclusion and with non-stoichiometric ratios enables all three sub-lattices of aluminate spinels to contribute configurational entropy, which is inherently unachievable in many HEO material systems.

Optical Properties of Multi-Cationic Aluminate Spinels

Figures 6A, 6B:
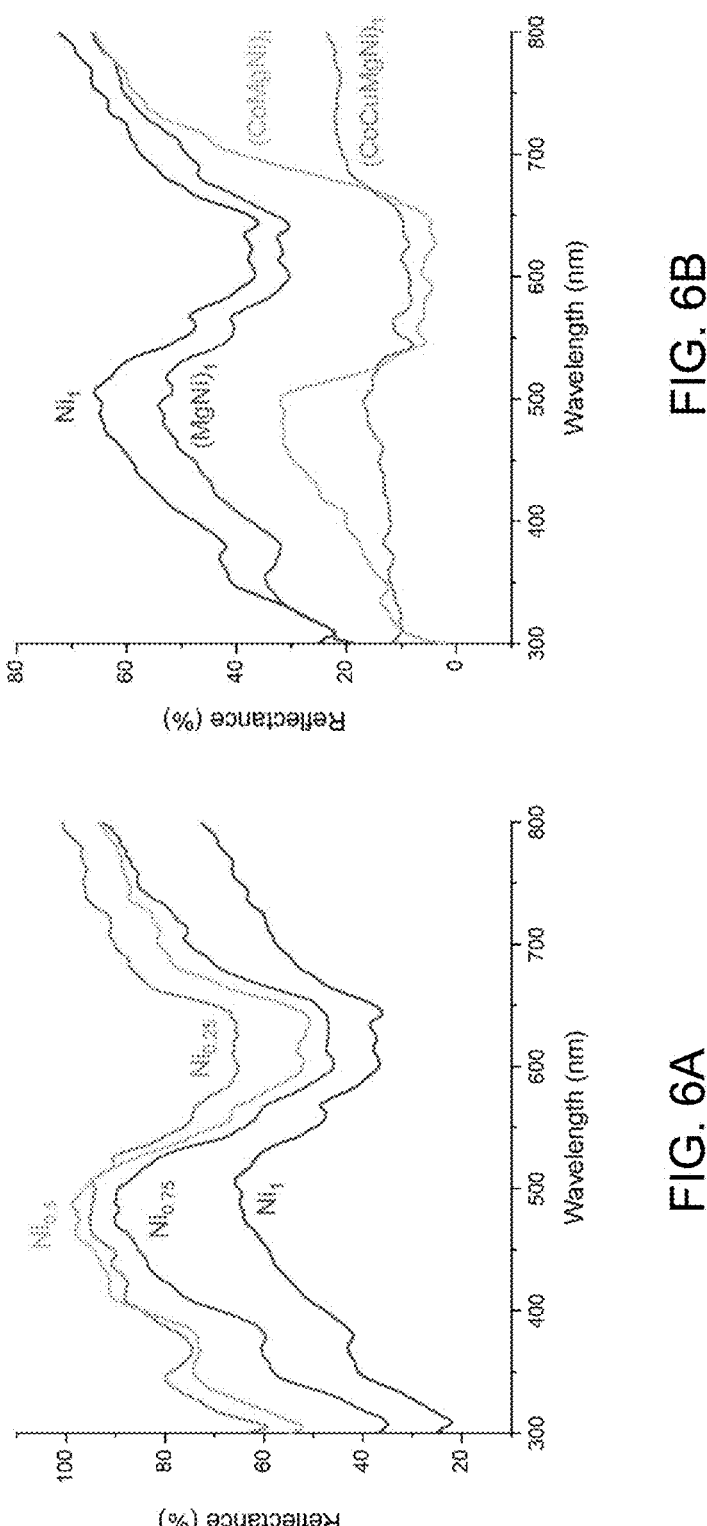
FIG. 6A shows reflectance spectra of nickel aluminate spinels with varying $Ni^{2+}:Al^{3+}$ ratio.
FIG. 6B shows reflectance spectra of nickel aluminate spinels with the addition of other divalent metal cations.

The role of stoichiometry and compositional complexity on material properties relevant to aluminate spinels applications was evaluated. $NiAl_2O_4$, $CoAl_2O_4$, and $CuAl_2O_4$ spinels commonly serve as cyan, blue, and red-brown pigments in paints, dyes, inks, and other aesthetic coatings. See B. Serment etal., *ACS Omega* 5, 18651 (2020); L. Torkian and M. Daghighi, *Adv. Powder Technol.* 25, 739 (2014); and T. Tangcharoen et al., *J. Adv. Ceram.* 8, 352 (2019). The color of these metal oxides is known to be influenced by structural parameters relevant to the synthesis method used and transition metal constituents. See T. Tangcharoen et al., *J. Adv. Ceram.* 8, 352 (2019). FIG. 6A shows spectra of nickel spinels with varying Ni:Al ratio, all calcined at 950° C. and quenched. The spectra of $Ni_1$ is comparable to those previously reported for nickel aluminate spinels, with absorption bands near 380 nm and from 600-645 nm ascribed to $v_3(^3A_{2g} \rightarrow ^3T_{1g}(P))$ and $(^3T_1(F) \rightarrow ^3T_{1g}(P))$ electronic transitions of $Ni^{2+}$ within the spinel structure. See M. Gil-Calvo et al., *Appl. Catal. B* 209, 128 (2017). Lowering the Ni:Al ratio below stoichiometric values increases reflectivity across the visible spectrum, in agreement with previous observations. See S. Zhang et al., *Appl. Catal. B* 291, 120074 (2021). CIELAB color space measurements were taken to quantify changes in lightness and coloration, as shown in Table V. Lightness, measured as L*, consistently decreased with increasing content of photo absorbing nickel cations. a* and b* values were primarily negative for this sample set, indicating green-blue coloration characteristic of nickel aluminates. See B. Serment etal., *ACS Omega* 5, 18651 (2020). Digital images of these samples and others show significant variation in color achieved by modulating $M^{2+}:Al^{3+}$ stoichiometry in nickel, copper, and cobalt aluminates. Non-stoichiometric spinels clearly adopt unique colors unachieved in the stoichiometric oxide and provide a wider range of pigment properties.

TABLE V

| CEILAB chromaticity coordinates for nickel aluminate spinels with varying $Ni^{2+}:Al^{3+}$ ratio. | | | |
| --- | --- | --- | --- |
| Sample | L* | a* | b* |
| $Ni_{0.25}$ | 89.214 | −9.243 | 13.294 |
| $Ni_{0.5}$ | 85.100 | −15.061 | −22.658 |
| $Ni_{0.75}$ | 81.387 | −16.332 | −21.595 |
| $Ni_1$ | 73.763 | −14.778 | −13.507 |

The incorporation of multiple divalent cationic elements was next evaluated with spectra shown in FIG. 6B. Spectral features are similar for the $Ni_1$ and $(MgNi)_1$ samples, since magnesium does not significantly absorb visible light. Co-

TABLE IV

| Measured compositions and site occupancies modeled through Rietveld refinement of select spinel samples. | | | | |
| --- | --- | --- | --- | --- |
| Sample | Measured total $M^{2+}$ composition (x in $M_xAl_2O_z$) | Lattice parameter (Å) | A-site occupancy | B-site occupancy | O-site occupancy |
| $Mg_1$ | 0.90 | 8.078 | $Mg_1$ | $Al_2$ | $O_4$ |
| $Ni_1$ | 0.99 | 8.056 | $Al_1$ | $Al_1Ni_1$ | $O_4$ |
| $Ni_{0.75}$ | 0.76 | 8.047 | $Al_{0.98}$ | $Al_{1.02}Ni_{0.76}$ | $O_{3.82}$ |
| $Ni_{0.5}$ | 0.49 | 8.032 | $Al_{0.9}$ | $Al_{1.1}Ni_{0.56}$ | $O_{3.56}$ |
| $(CoCuMgNi)_1$ | 1.01 | 8.077 | $Al_{0.2}M_{0.69}$ | $Al_{1.8}M_{0.22}$ | $O_{3.35}$ |
| $(CoMgNi)_{0.75}$ | 0.81 | 8.069 | $Al_{0.1}M_{0.52}$ | $Al_{1.9}M_{0.1}$ | $O_{3.6}$ | addition of cobalt lowers reflectance across the visible spectrum, particularly in the 500-700 nm range. This absorption band is ascribed to the $^4A_2(F) \rightarrow ^4T_1(P)$ transition of $Co^{2+}$ ions within an aluminate spinel structure. See L. Torkian and M. Daghighi, *Adv. Powder Technol.* 25, 739 (2014); and R. Chueachot and R. Nakhowong, *Mater. Lett.* 259, 126904 (2020). Reflectance of $(CoCuMgNi)_1$ is lowered substantially through the addition of copper, which exhibits broad absorption bands across the visible spectrum due to charge transfer between oxygen anions and $Cu^{2+}$ occupying octahedral sites. See T. Tangcharoen et al., *J. Adv. Ceram.* 8, 352 (2019). As shown, HEO spinels can be highly effective UV-vis absorbers via incorporation of multiple transition metal constituents which absorb light over different wavelength ranges. Tunable light absorption properties, along with the excellent thermal stability of aluminate spinels, give these materials great potential for photocatalytic and solar thermal applications. See S. R. Atchuta et al., *Solar Energy* 199, 453 (2020); and T. Tangcharoen et al., *J. Mater. Sci.: Mater. Electron.* 29, 8995 (2018).

Thermal Stability

Figure 7:
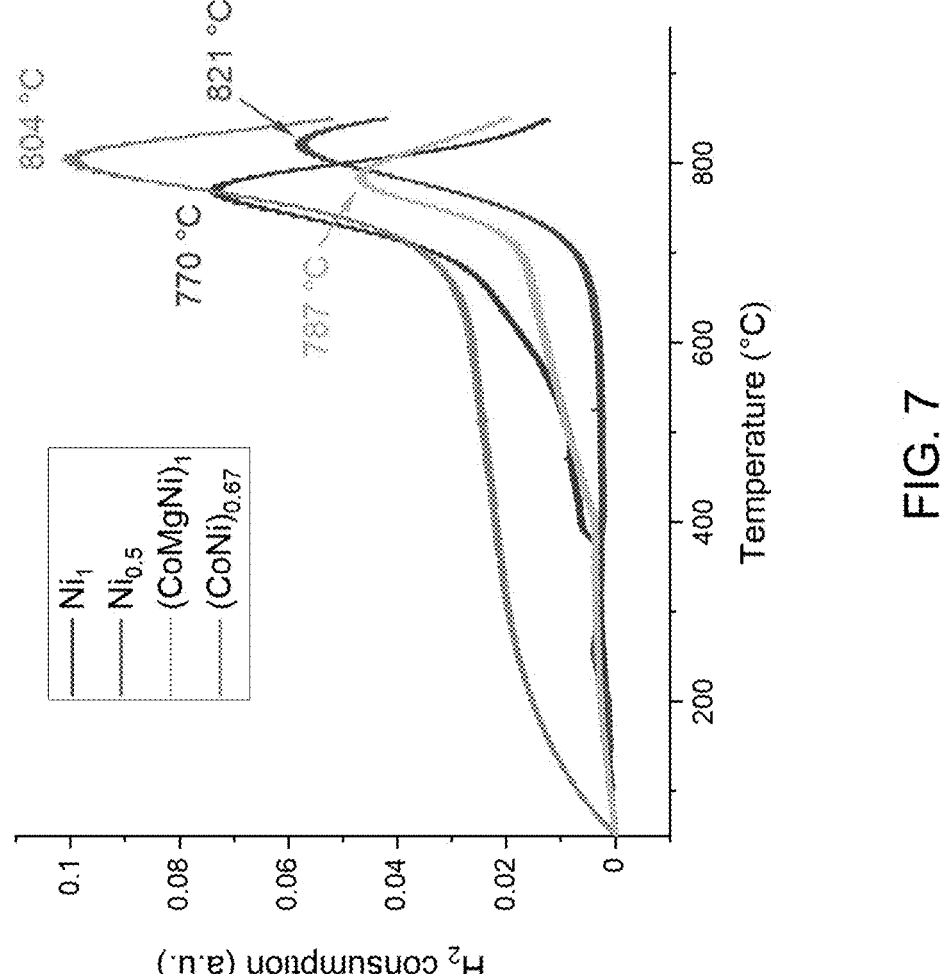
FIG. 7 is a graph of hydrogen temperature programmed reduction ($H_2$-TPR) profiles of select Ni-containing spinel samples.

Aluminate spinels are commonly used in high temperature environments due to their excellent thermal stability. However, the desired chemical properties of these spinels are application dependent. Chemical inertness is required of refractory spinel materials, while spinel catalysts must exhibit chemical interaction with reactant molecules and even be structurally reducible to form catalytically active metallic phases. See H. Tang et al., *Materials (Basel)* 14, 3050 (2021); and S. Zhang et al., *Appl. Catal. B* 291, 120074 (2021). To assess the effect of vacancies and multiple divalent metals on spinel stability, select Ni-containing samples were evaluated through hydrogen temperature programmed reduction ($H_2$TPR). FIG. 7 shows the resulting profiles with the temperature of reduction peaks labeled. All primary reduction peaks occur at temperatures well over 700° C. and correspond to reduction of the nickel aluminate phase. See G. Wang et al., *Energy Technol.* 7, 1800359 (2019). The reduction mechanism was previously identified as a separation of nickel from the spinel lattice to form metallic nickel and alumina phases. See E. Ustundag et al., *Appl. Phys. Lett.* 76, 694 (2000). Of the spinels evaluated, $Ni_1$ shows the lowest reduction peak temperature at 770° C., at which point the spinel structure is compromised. Inclusion of Co and Mg shifts the reduction peak to higher temperatures. This result agrees with previous observations that $CoAl_2O_4$ and $MgAl_2O_4$ spinels are less reducible than $NiAl_2O_4$. See H. Y. Wang and E. Ruckenstein, *Catal. Lett.* 75, 13 (2001). The reduction peak is also shifted to higher temperatures through vacancy inclusion. This shift was as large as 51° C. between $Ni_1$ and $Ni_{0.5}$ samples, suggesting that sub-stoichiometric spinels withstand chemically aggressive environments at higher temperatures than stoichiometric counterparts. While alumina achieves excellent chemical resistance without divalent metal constituents, alumina phase changes occurring above 800° C. significantly alter the material structure. See S. Lamouri et al., *Bol. Soc. Esp. Cerám. V.* 56, 47 (2017). Spinel phases, on the other hand, are thermally stable at higher temperatures, but are more chemically reactive in conventional stoichiometric form. Since sub-stoichiometric spinels showed no alumina phases, even after 950° C. aging, and showed increased reduction peak temperatures, cationic vacancies can provide a valuable parameter for optimizing desired thermal and chemical properties, which are unachieved in alumina and conventional stoichiometric spinels. Cationic vacancies yield the added benefit of reducing processing temperatures (and therefore energy), as well as use of transition metals, many of which are rare yet critical elements needed for emerging technologies.

Multi-Cationic Catalysts for Natural Gas Conversion

Figure 9B:
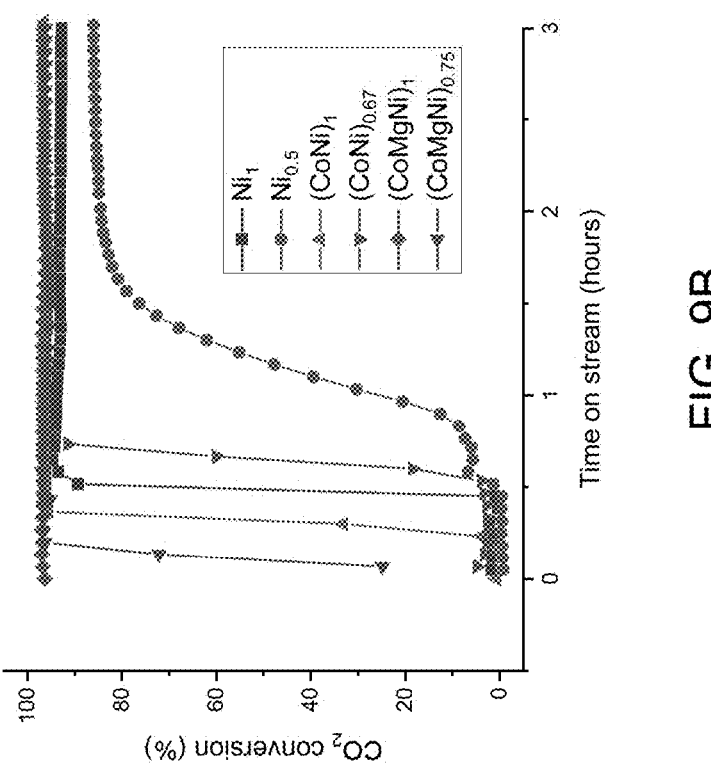
FIGS. 9A and 9B are graphs showing activation profiles of various catalysts for $CH_4$ and $CO_2$ conversion, respectively, according to the DRM reaction. In the graphs, the samples are labeled as X with the formula $XAl_2O_4$. For example, the sample labeled $Ni_1$ is an oxide with composition $NiAl_2O_4$. On stream conditions were temperature=775° C.; total flow rate=24 ml/min; gas composition=20% methane, 20% carbon dioxide, and 60% nitrogen; and catalyst mass=20 mg.
Figure 9A:
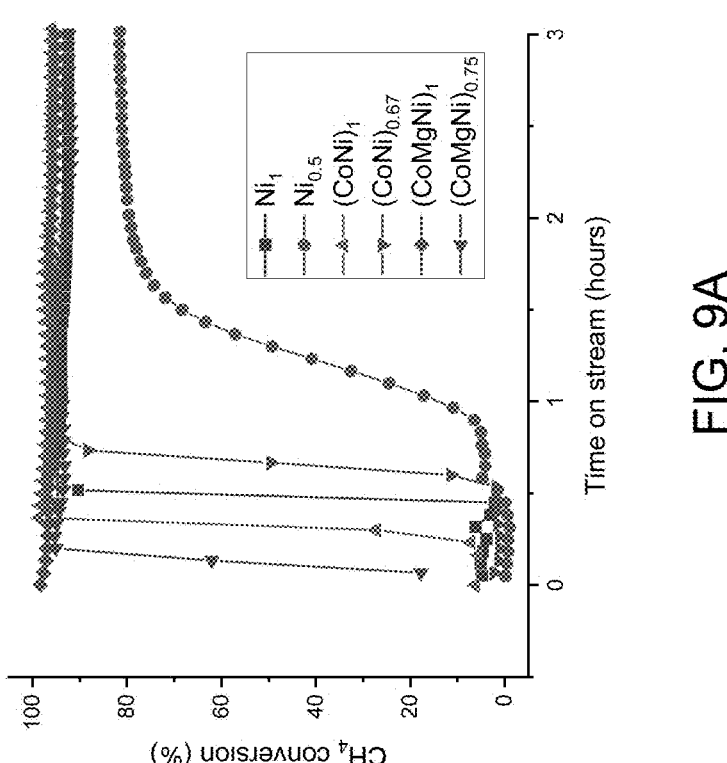
Figures 10A, 10B, 10C, 10D:
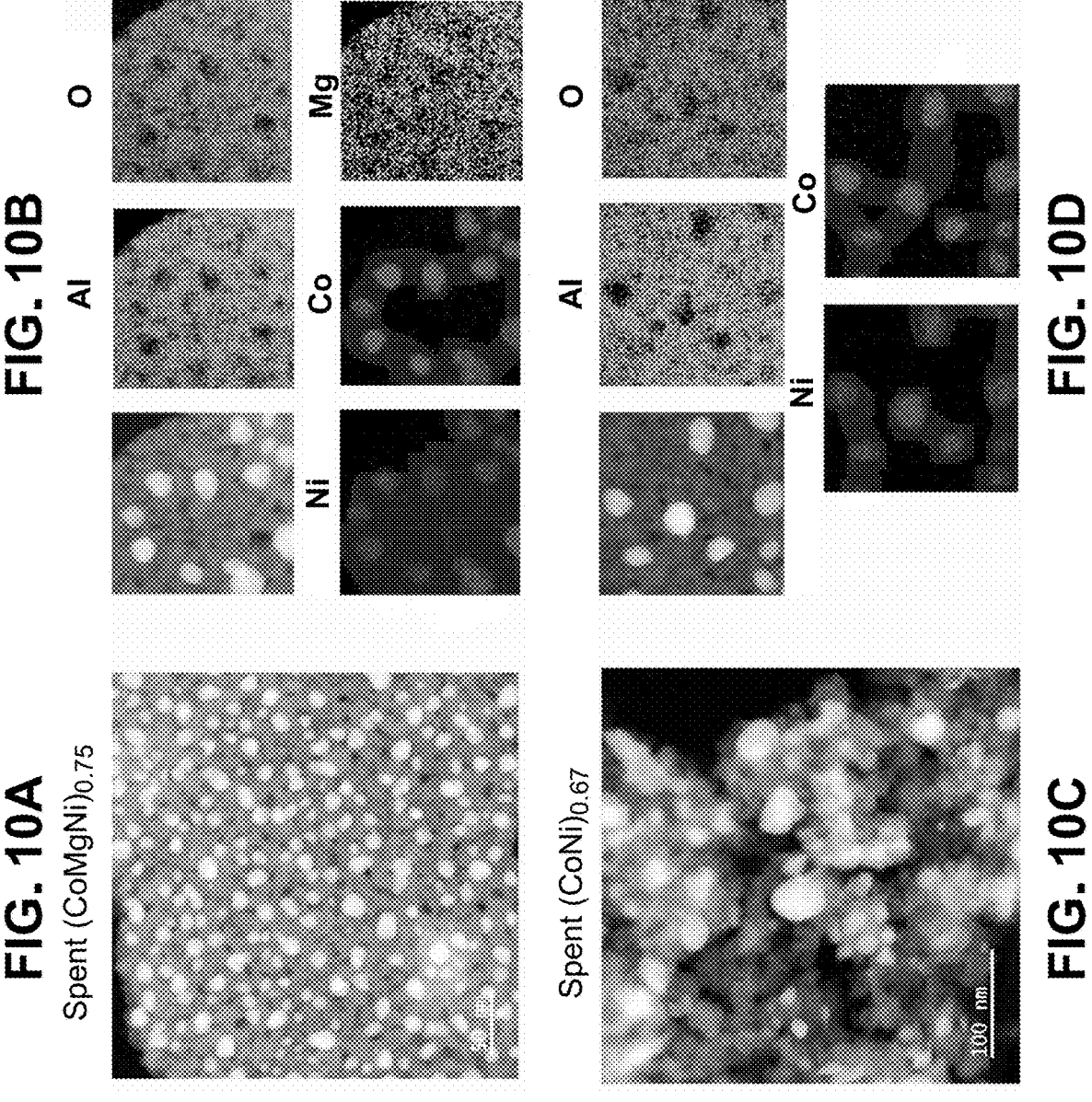
FIG. 10A shows an SEM image (left) and FIG. 10B shows an elemental mapping (right) of a sub-stoichiometric $(CoMgNi)_{0.75}$ sample after DRM reaction.
FIG. 10C shows an SEM image (left) and FIG. 10D shows an elemental mapping (right) of a sub-stoichiometric $(CoNi)_{0.67}$ sample after DRM reaction.
Figure 11:
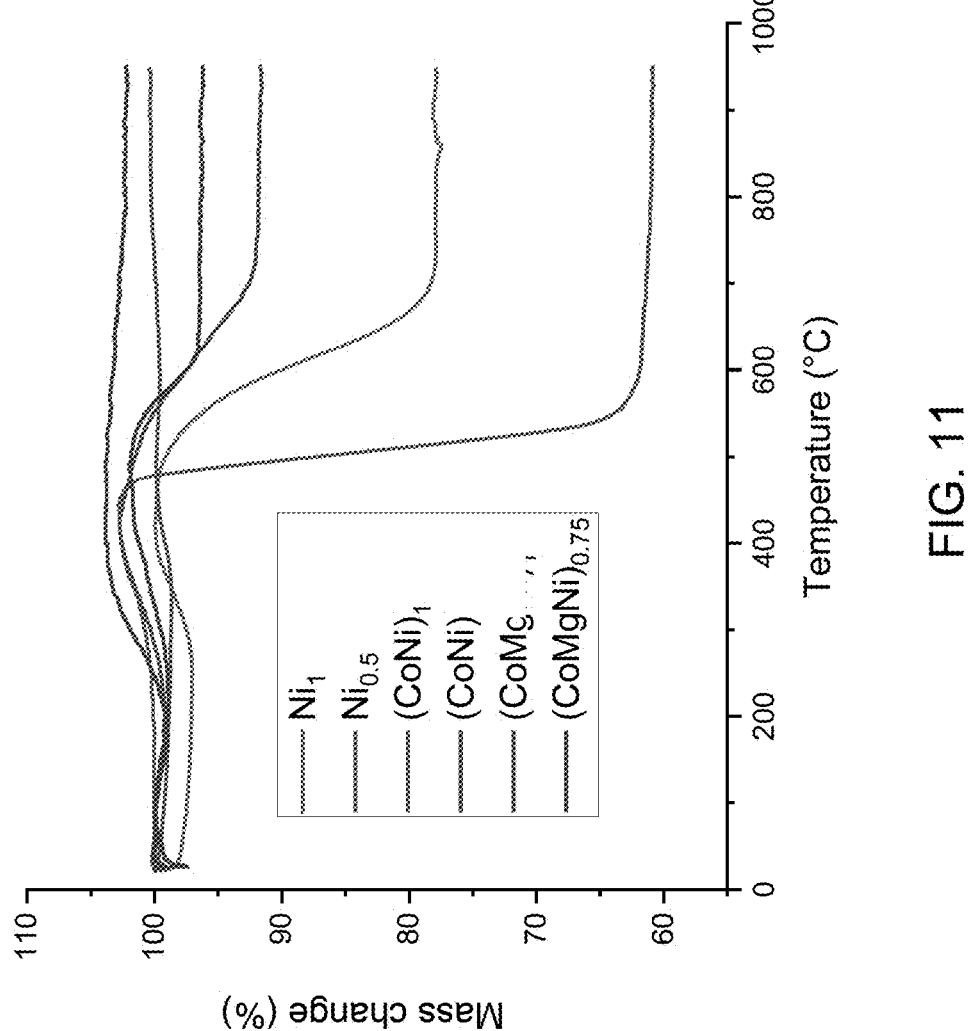
FIG. 11 is a thermogravimetric analysis (TGA) of various spent spinel catalysts after DRM. The TGA mass change indicates coke evolution.
Figure 12B:
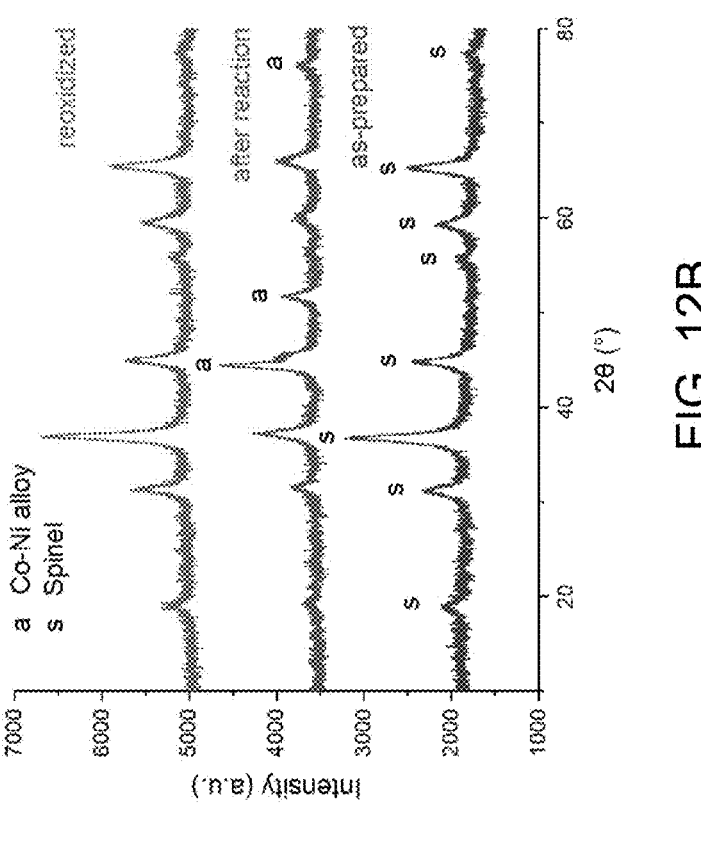
FIG. 12B shows XRD patterns of a $(CoMgNi)_{0.75}$ aluminate spinel before and after DRM reaction and after exposure of the spent spinel to oxidizing conditions. The multi-cationic aluminate spinel is fully regenerable due to entropic stabilization.
Figure 12A:
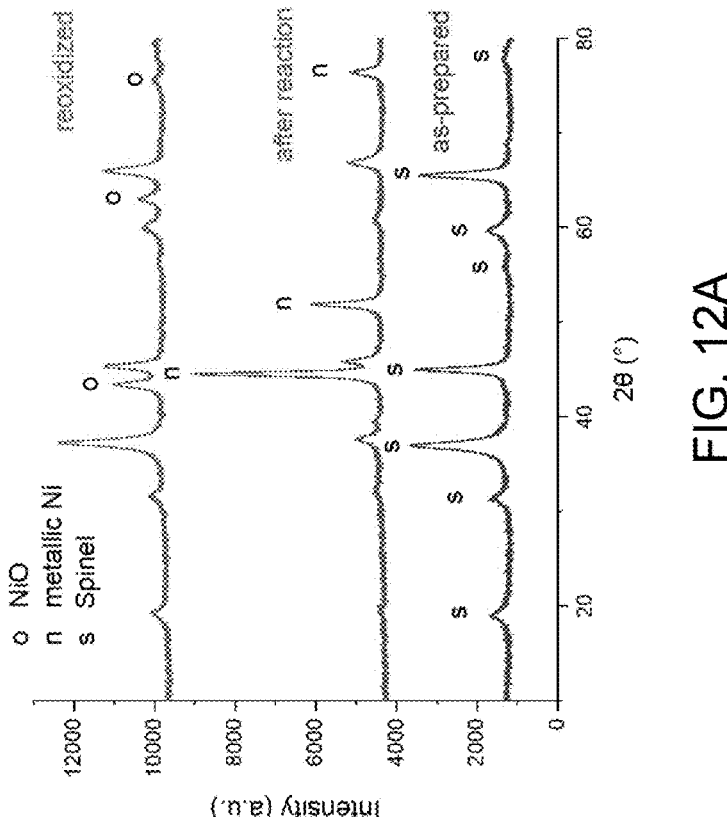
FIG. 12A shows XRD patterns of a $NiA_{12}O_4$ spinel before and after DRM reaction and after exposure of the spent spinel to oxidizing conditions.

The multi-cationic aluminate spinels are also useful as catalysts for the conversion of natural gas constituents. Among other reactions, this conversion includes the dry reforming of methane (DRM), according to the reaction $CH_4+CO_2 \rightarrow 2CO+2H_2$ DRM utilizes two greenhouse gases; carbon dioxide ($CO_2$) and methane ($CH_4$) to produce a synthesis gas (syngas) mixture of carbon monoxide (CO) and hydrogen ($H_2$), which is a very important precursor for the production of a variety of valuable chemicals and liquid fuels. Therefore, industrial adoption of the DRM reaction would represent a significant step toward decarbonizing the chemical industry. Dry reforming is usually performed in a temperature range of 650-850° C. The use of a catalyst may lead to a reduction of energy needed to drive the endothermic reforming reaction. However, dry reforming is not currently performed industrially due in part to poor catalyst performance. Ni-based catalysts are promising due to their high initial activity and low cost, but suffer from poor stability due to coke formation and/or sintering of isolated Ni species during the DRM reaction, as shown in FIG. 8A, hindering their commercialization. High temperature oxidation can effectively combust carbonaceous deposits which form on the catalyst surface during the natural gas conversion reactions and otherwise deactivate the catalyst. However, this heat treatment also lowers the surface area of conventional Ni-based catalysts through active particle sintering, lowering performance. As described above, mixtures of magnesium, nickel, cobalt, manganese, and other metal cations can be incorporated into the aluminate spinel structure. While nickel is the catalytically active element, the addition of other metals causes formation of bimetallic nanoparticles during DRM, as shown in FIG. 8B. Under reaction conditions, which include high temperatures and reducing atmospheres, these metals can segregate from the spinel structure to form bimetallic nanoparticles and activate more quickly and without pretreatment steps than catalysts containing only nickel, as shown in FIGS. 9A and 9B. In particular, both the stoichiometric and sub-stoichiometric ternary metal aluminate spinels, $(CoMgNi)_1$ and $(CoMgNi)_{0.75}$, activate rapidly and continuously operate at near 100% $CH_4$ and $CO_2$ conversion for in excess of several hours. These multi-cationic catalysts also show improved product selectivity, reduced coke formation, and excellent stability compared to conventional metallic catalysts. SEM and energy dispersive spectroscopy (EDS) analysis, shown in FIGS. 10A-10D, indicate that Co—Ni bimetallic particles form within both the $(CoMgNi)_{0.75}$ and $(CoNi)_{0.67}$ multi-cationic oxides during DRM reaction. Such Co—Ni bimetallic particles are known to be selective catalysts. FIG. 11 shows a thermogravimetric analysis (TGA) of various spent catalysts after DRM reaction. The TGA scans indicate much less coke formation on the multi-cationic catalysts. Further, the addition of many metals promotes regeneration of the spent catalyst under oxidizing conditions. In particular, regenerative treatment causes the segregated metals to re-incorporate into the spinel lattice, which is highly thermally stable. As shown in FIG. 12A, with the Ni-only spinel, $NiAl_2O_4$, metallic Ni particles form due to sintering of isolated Ni species during the DRM reaction. However, during regeneration, these metallic Ni particles form NiO particles under oxidizing conditions. Conversely, as shown in FIG. 12B, the multi-cationic catalyst, $(CoMgNi)_{0.75}Al_2O_4$ forms Co—Ni bimetallic particles during the DRM reaction. However, rather than forming segregated metal oxide particles, the original aluminate spinal structure is regenerated under oxidizing conditions. This is because the addition of many metals in these catalysts increases configurational entropy of the spinel phase, which creates a thermodynamic driving force for the consolidation of these elements into a phase pure structure. This prevents sintering and deactivation of the active metal particles during regeneration. Therefore, the complex aluminate catalysts of the present invention demonstrates excellent stability.

The present invention has been described as multi-cationic aluminate spinels. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A multi-cationic aluminate spinel, comprising sub-stoichiometric amounts of at least three different divalent metal cations in nominally equimolar concentrations to a concentration of a plurality of unoccupied cation sites in an aluminate spinel crystal structure.

2. The multi-cationic aluminate spinel of claim 1, wherein the at least three different divalent metal cations are selected from the group consisting of alkaline-earth metals and transition metals.

3. The multi-cationic aluminate spinel of claim 2, wherein the alkaline earth metals comprise magnesium and calcium and the transition metals comprise cobalt, copper, manganese, nickel, chromium, iron, and zinc.

4. The multi-cationic aluminate spinel of claim 1, wherein the at least three different divalent metal cations comprises sub-stoichiometric amounts of at least four different divalent metal cations in nominally equimolar concentrations to the concentration of the plurality of unoccupied cation sites.

5. The multi-cationic aluminate spinel of claim 1, wherein the at least three different divalent metal cations comprises nickel, thereby providing a Ni-based multi-cationic aluminate spinel catalyst.

6. The multi-cationic aluminate spinel of claim 5, wherein the Ni-based multi-cationic aluminate spinel catalyst catalyzes the dry reforming of methane reaction.

7. The multi-cationic aluminate spinel of claim 1, wherein the aluminate spinel crystal structure is calcined at greater than 800° C.

8. A method of dry reforming of methane, comprising:

providing the Ni-based multi-cationic aluminate spinel catalyst of claim 5, and exposing a stream comprising methane and carbon dioxide to the Ni-based multi-cationic aluminate spinel catalyst at greater than 600° C., thereby catalytically reacting the methane and carbon dioxide to produce a synthesis gas.

9. The method of claim 8, further comprising regenerating the exposed Ni-based multi-cationic aluminate spinel catalyst under oxidizing conditions.

* * * * *